United States Patent
Maufer et al.

(10) Patent No.: US 7,234,161 B1
(45) Date of Patent: Jun. 19, 2007

(54) METHOD AND APPARATUS FOR DEFLECTING FLOODING ATTACKS

(75) Inventors: Thomas A. Maufer, Menlo Park, CA (US); Sameer Nanda, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 835 days.

(21) Appl. No.: 10/334,656

(22) Filed: Dec. 31, 2002

(51) Int. Cl.
*H04L 29/06* (2006.01)
*G06F 15/16* (2006.01)

(52) U.S. Cl. ............................. 726/12; 726/13; 726/14; 709/227

(58) Field of Classification Search ................. 726/11, 726/12
See application file for complete search history.

(56) References Cited

U.S. PATENT DOCUMENTS

| | | | |
|---|---|---|---|
| 6,768,726 B2 * | 7/2004 | Dorenbosch et al. ....... | 370/331 |
| 6,779,033 B1 * | 8/2004 | Watson et al. ............... | 709/227 |
| 6,789,203 B1 * | 9/2004 | Belissent ...................... | 726/22 |
| 7,043,759 B2 * | 5/2006 | Kaashoek et al. ............ | 726/25 |
| 2001/0042200 A1 * | 11/2001 | Lamberton et al. ......... | 713/151 |
| 2002/0035699 A1 * | 3/2002 | Crosbie ........................ | 713/201 |
| 2002/0103916 A1 * | 8/2002 | Chen et al. ................... | 709/229 |
| 2003/0023712 A1 * | 1/2003 | Zhao et al. ................... | 709/223 |
| 2003/0037164 A1 * | 2/2003 | Chaar et al. .................. | 709/237 |
| 2003/0177384 A1 * | 9/2003 | Jones et al. ................... | 713/201 |
| 2004/0015721 A1 * | 1/2004 | Eastlake, III ................ | 713/201 |
| 2004/0187032 A1 * | 9/2004 | Gels et al. .................... | 713/201 |

OTHER PUBLICATIONS

Stevens, W. Richard, TCP/IP Illustrated vol. 1, 1994, Addison Wesley, p. 1.c, 231, 252.*

* cited by examiner

*Primary Examiner*—Kambiz Zand
*Assistant Examiner*—Thomas Szymanski
(74) *Attorney, Agent, or Firm*—Patterson & Sheridan, L.L.P.

(57) ABSTRACT

Method and apparatus for deflecting connection flooding attacks. Specifically, the stateful firewall allows all connection attempts to flow into the destination host, but monitors the connection attempts to ensure that only legitimate connections are allowed. If the firewall detects that a connection is half-open for longer than a certain timer threshold, it will instruct the destination host to tear down the half-open connection, thereby freeing up resources in the destination host for other connection attempts. The timer threshold can be dynamically adjusted if a connection flooding attack is detected.

25 Claims, 5 Drawing Sheets

METHOD AND APPARATUS FOR DEFLECTING FLOODING ATTACKS

The present invention relates to a novel method and apparatus for effecting system connections. More specifically, the present invention provides a stateful firewall that monitors connection attempts to a destination host to ensure that only legitimate connections are allowed.

BACKGROUND OF THE DISCLOSURE

With the proliferation of the Internet, host systems can provide their services to numerous client systems, where both host and client systems are distributed throughout the world. Once a proper connection is established, information can flow freely between a host system and a client system.

For example, in a conventional distributed network a plurality of host systems or servers are in communication with a plurality of client systems via a network or a collection of networks, e.g., the Internet. The architecture of such a distributed network is a source of strength (e.g., enabling free flow of information between numerous systems) and a source of vulnerability (e.g., creating vulnerabilities to malicious attacks).

Specifically, when a client system attempts to establish a connection, e.g., a TCP (Transmission Control Protocol) connection, to a host system, the client and host exchange a set sequence of messages or packets. This general approach applies to all TCP connections: Web, telnet, email and so on.

The client system starts by sending a "SYN" message or packet to the host system. The host system then acknowledges the SYN message by sending a "SYN-ACK" message back to the client system. The client then finishes establishing the connection by responding with an "ACK" message, which completes what is known as a "TCP three-way handshake".

Unfortunately, this simple connection protocol is vulnerable to potential abuse by malicious users. For example, a remote client may transmit a large volume of TCP connection requests that cannot be completed, i.e., where the host system has sent an acknowledgement (SYN-ACK) back to the SYN packet's IP Source Address, but will never receive the ACK message since the source address was spoofed, and is either an invalid address, or a machine that did not send the SYN packet in the first place. Because only the receiver of the SYN (which has sent the SYN-ACK) thinks the connection is open, the connection is in the "half-open" state.

The potential abuse is that the host system has built in its system memory a data structure of finite size that describes all connections, pending or active. By flooding the host system with an overwhelming amount of half-open connections, the effect of this attack on the host system is that this data structure will quickly fill up, thereby crippling its ability to establish new connections with legitimate TCP users. This type of "SYN flooding" is the basis for several forms of distributed "Denial of Service" attacks on the Internet.

Creating half-open connections can be easily accomplished with IP spoofing. Specifically, the attacking client system will send SYN messages to the target host system. These SYN messages appear to be legitimate but may in fact reference a client system that is unable to respond to the SYN-ACK message or is not actually trying to establish a connection. The effect is that the final ACK message will never be sent to the target host system.

Although most host systems will eventually remove expired half-open connections, the attacking system can simply continue sending IP-spoofed packets at a greater rate than the rate in which expired half-open connections are removed. The location of the attacking client system is often unknown because the source addresses in the spoofed SYN packets are often not genuine. Thus, when the SYN packet arrives at a target host system, it is often impossible to determine its true source.

Host systems that are the targets of such malicious attacks will likely be rendered inoperable. The inability or even the mere difficulty of accepting any new legitimate incoming network connections will greatly damage the business of a host system.

Therefore, a need exists for a novel method and apparatus that is capable of deflecting such attacks without having to modify the operating system of the host system or requiring complex packet manipulation for active TCP sessions.

SUMMARY OF THE INVENTION

In one embodiment of the present invention, a novel method and apparatus for deflecting connection flooding attacks is integrated into a stateful firewall. Specifically, the stateful firewall allows all connection attempts to flow into the destination host, but monitors the connection attempts to ensure that only legitimate connections are allowed. If the firewall detects that a connection is half-open longer than a certain timer threshold, then it will inform the local host (the destination host in the original SYN packet) to tear down the half-open connection, thereby freeing up resources in the destination host for other connection attempts. The timer threshold can be dynamically adjusted if a connection flooding attack is detected.

In an alternate embodiment, if the half-open connection was not due to a malicious attacker, but rather simply a delayed or lost ACK from the remote client system the firewall will effect the tear down of the client system's connection and allow the client system to try to connect again if it wants to. In fact, the firewall may optionally increase the timer threshold for that particular client system to be more lenient since that particular client system appears to need more time to respond.

In yet another embodiment, if the firewall receives the delayed ACK from the client system after the timer threshold, the firewall will generate a SYN message to the host system on behalf of the client system. In turn, the host system will respond with a SYN-ACK message and the firewall will then forward the delayed ACK message to the host system. This action on the part of the firewall ensures that both sides of the connection will have the same understanding of the proper TCP state for this connection.

One benefit of the present invention is that the destination host's operating system does not need to be specially modified to moderate connection flooding attacks. Since numerous host systems may reside behind the firewall, updating all the operating systems is impractical and costly, if patches for this vulnerability are even available. Integrating the present invention in the firewall in a division-of-labor approach allows all the host systems to share the benefit of a "dynamic connection acceptance rate" when the firewall detects a connection flooding attack. The firewall uses its considerable memory to track all pending connections to each destination host, and cleans up the destination machine's connection table whenever new connection attempts fail.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
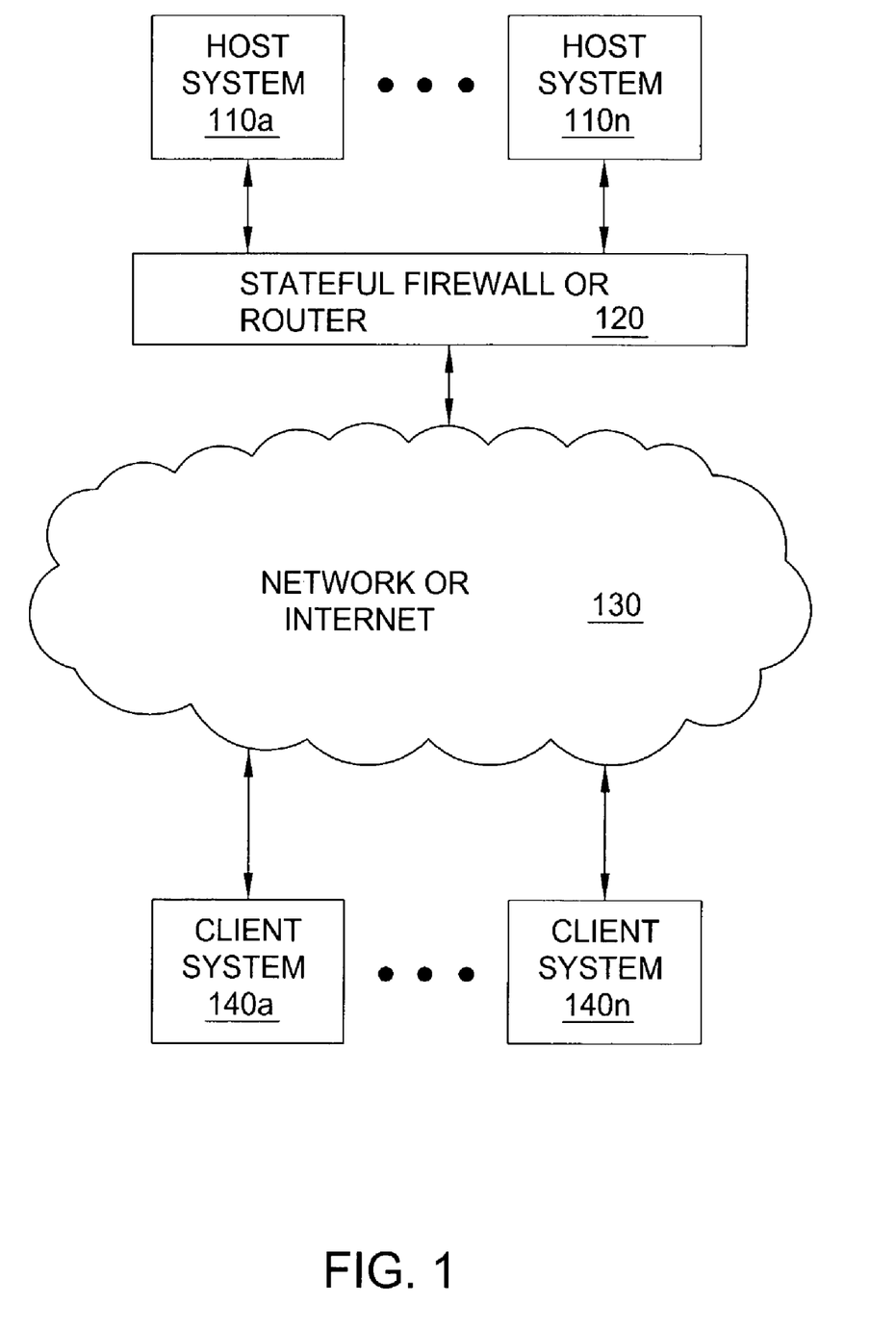
FIG. 1 illustrates a block diagram of a system of the present invention.

FIG. 1 illustrates a block diagram of a system 100 of the present invention. Specifically, system 100 illustrates a plurality of host systems 110a-n that are in communication with a plurality of client systems 140a-n via a network or the Internet 130. In the present invention, a stateful firewall 120 is deployed between the host systems and the network 130. A method for deflecting connection flooding attacks of the present invention is deployed within the stateful firewall 120. It should be noted that although the present invention is disclosed in the context of a stateful firewall, the present invention can be integrated and adapted into software modules and/or devices that reside between the host systems and the client systems, e.g., a router and the like.

Figure 2:
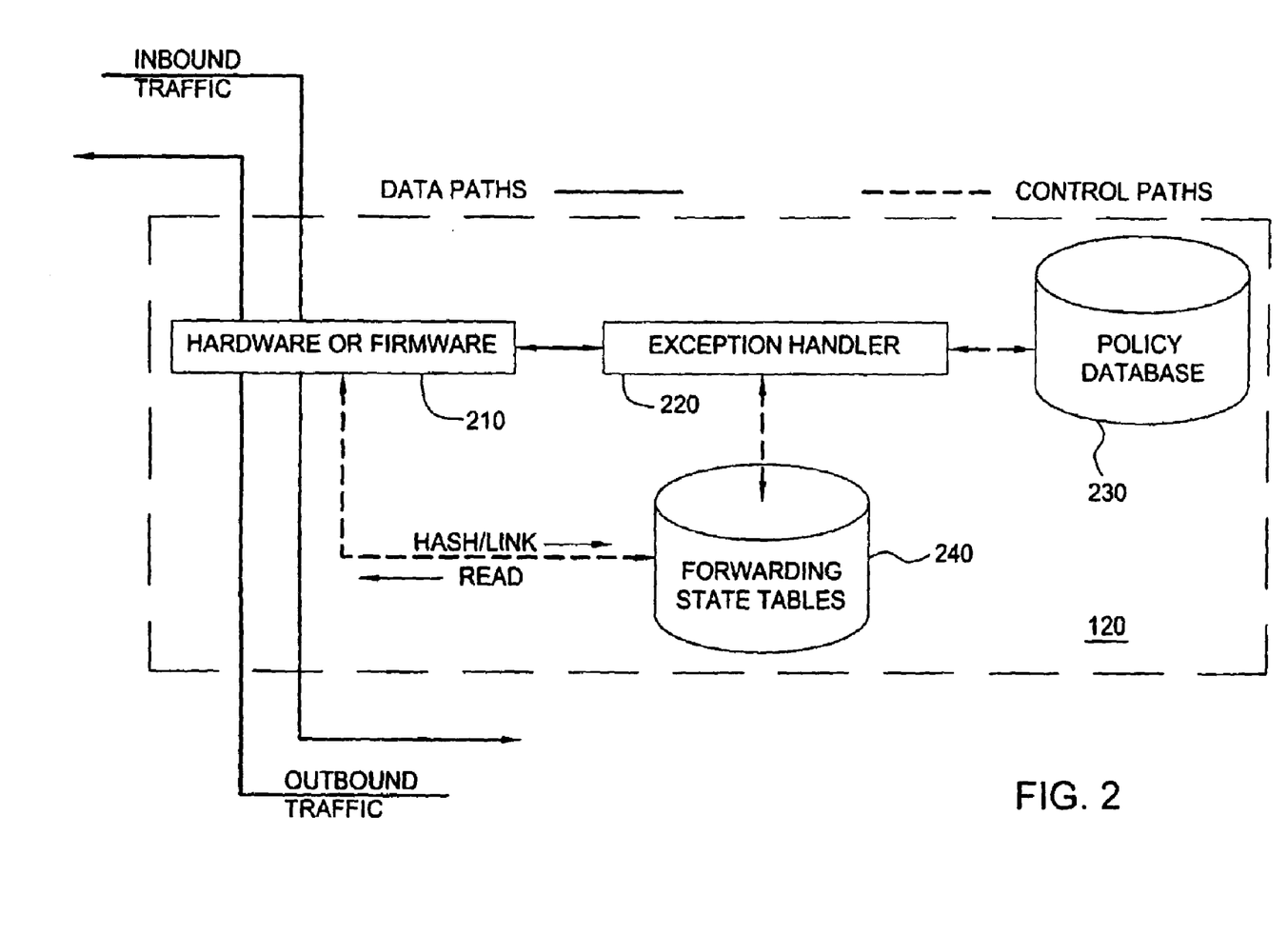
FIG. 2 illustrates a block diagram of the present invention integrated into a stateful firewall.

FIG. 2 illustrates a block diagram of the present invention integrated into a stateful firewall or gateway 120. Throughout the present disclosure, the terms firewall and gateway are used interchangeably. In such a stateful firewall implementation, there is a high-level software component 220 that evaluates new connections against a set of policy rules stored in storage or memory 230. This software component handles packets that broadly represent request for and acknowledgement of system connections, e.g., packets with the SYN bit set in accordance with TCP, UDP or other protocols. The software handles new packets that do not have a matching state table entry. In turn, the hardware or firmware component 210 (or more broadly, a processing unit such as a central processing unit and the like) intercepts each packet and matches it against the state tables 240 that were created by the higher-layer software.

It should be noted that the functions of the present invention performed by the stateful firewall or gateway 120 as discussed below can be implemented within a computer system, e.g., a CPU executing stored programs loaded into a memory or by a separate dedicated processing unit. For example, the functions performed by the stateful firewall or gateway 120 can be implemented within a network processing unit (NPU) as disclosed in U.S. patent application entitled "Method And Apparatus For Performing Network Processing Functions", filed on Dec. 13, 2002 with Ser. No. 10/319,791, which is herein incorporated by reference.

In operation, the firewall will trap all TCP packets that arrive with the SYN bit set, whether from the local LAN(s) or from the Internet. These TCP SYN packets are all sent to an "Exception Handler" routine 220. TCP packets arriving from the Internet could be from legitimate clients, or from malicious attackers, containing spoofed IP source addresses. Regardless of the actual source IP address of the TCP SYN packet (e.g., local or remote), the gateway records all the information about the packet, including source and destination IP addresses, source and destination TCP ports, and the client-specified TCP initial sequence number and the client's receive window size. After collecting this information, the gateway forwards the packet to its destination host, which would be behind the firewall if the packet was inbound from the Internet.

When the destination host replies with a SYN-ACK packet, the gateway gets a copy of this packet because it also has the TCP SYN bit set. At this point, the gateway records the server-specified sequence number, the ACK number (the client's sequence number plus one), and the server's window size. The gateway also starts a timer as the SYN-ACK packet is forwarded on its way back to the client system.

In one embodiment, the gateway will wait up to a predefined timer threshold (e.g., 2000 milliseconds) for the client system to reply with an ACK packet back to the destination host that matches the SYN-ACK that the host sent to the client. If the timer expires, the gateway will send a TCP RST packet to the destination host, which is a packet whose IP source address is the same as the client's IP address, and the expected sequence number (one greater than the ACK number in the SYN-ACK packet). This provides the destination host with a graceful shutdown for this half-open TCP connection, so that it can free up the space in its connection table that would have been used if this connection attempt had succeeded.

The gateway also maintains a "rate of failed TCP connections" variable, and will become more aggressive if a flooding attack is detected, e.g., the "unacknowledged SYN-ACK timer" will expire more quickly, i.e., reducing the threshold to 750 ms rather than 2000 ms and so on. Reducing the duration of this timer limits the window of vulnerability so that host systems behind the gateway will be shielded from attacks to a greater extent. Although the gateway will tear down all half-open connections after the per-connection timer has expired, it is still possible for an attacker to attempt to open a considerable number of connections in 2000 ms, so it is prudent to monitor the situation and limit the exposure once an attack is detected.

Although the gateway has torn down the half-open connection at the host system, the gateway may still mark the connection state as "inactive and possibly bad" and allow the state to remain for a short period of time, e.g., 5 seconds. The reason is that if the client system is in fact a real machine trying to connect, as opposed to a fictitious IP address created for the purposes of an attack, then the gateway may see a delayed ACK or re-transmitted packet arriving from the client system in response to the SYN-ACK that the host system had sent through the gateway. This delayed ACK will not match a table entry in the hardware's memory, since no connection was ever successfully established, but the software layer 220 will receive the packet since the default action for a table miss is to punt the packet to the software 220.

Under this scenario, the gateway can address the delayed ACK in two different approaches. First, the gateway can send a TCP RST (Reset) to the client system, by using the host system's IP address as the packet's IP source address, and by using the correct SEQ and ACK numbers, so that the client system won't be left in an "established" state while the host system has already been told by the gateway to shut down the connection. By shutting down the half-open connection on the client system, it can now initiate another attempt for connection. Since the gateway has observed that this IP address appears to be a valid client system, it may choose to be more lenient on future connection attempts from this client IP address, i.e., raising the timer threshold.

In a second more complex approach, the gateway may optionally generate and forward an ACK packet on behalf of the client system, provided that the packet information is still available. The host system will respond with a SYN-ACK and the gateway will simply forward the delayed ACK in response. This allows the delayed ACK to be accepted without requiring the client system to reinitiate a second connection request. The various embodiments of the present method for deflecting connection flooding attacks will now be disclosed in detail with reference to FIGS. 3-5.

Figure 3:
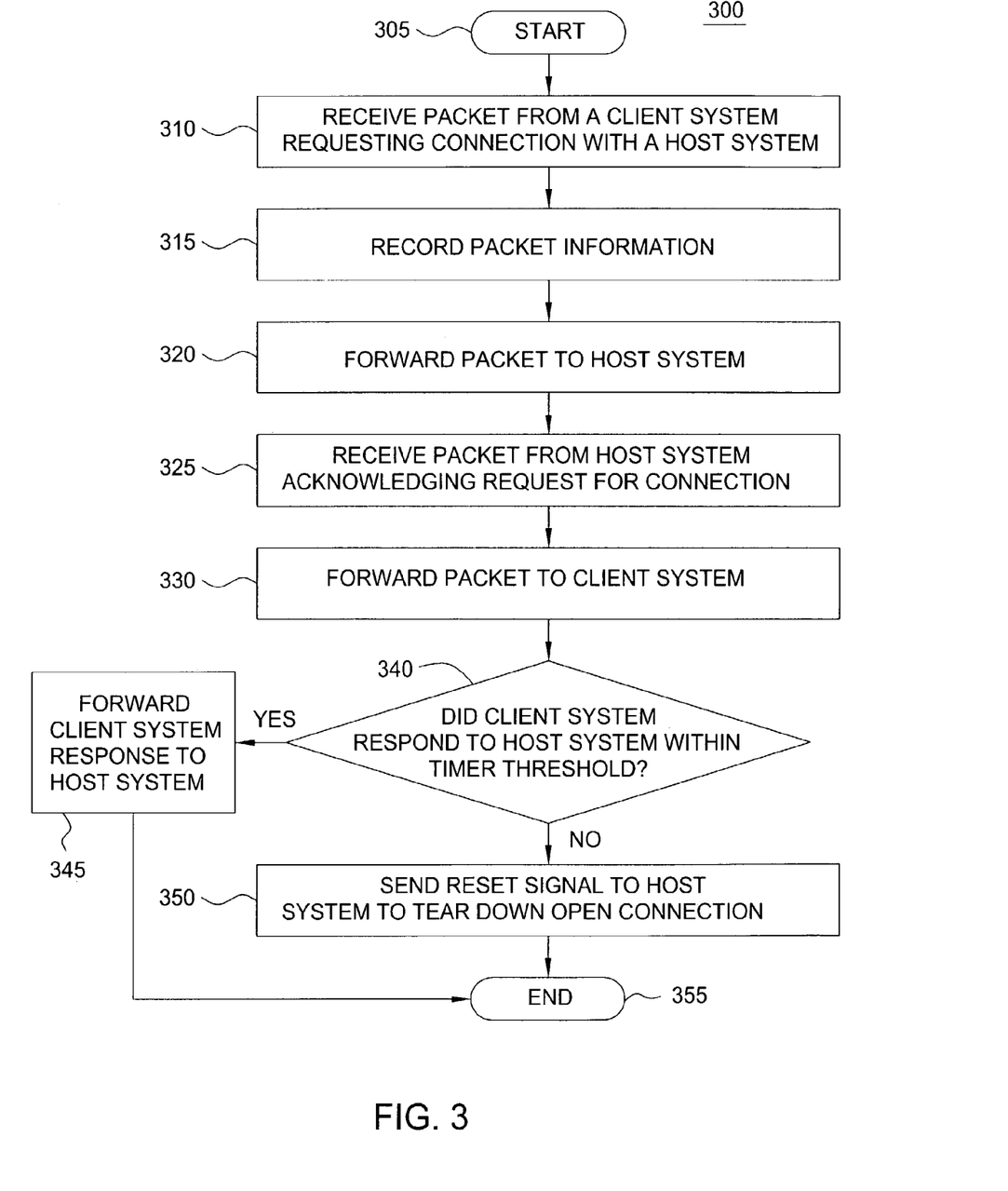
FIG. 3 illustrates a flowchart of a method for deflecting connection flooding attacks of the present invention.

FIG. 3 illustrates a flowchart of a method 300 for deflecting connection flooding attacks. Method 300 starts in step 305 and proceeds to step 310.

In step 310, the firewall receives a packet representative of a request for connection from a client system. In the context of TCP, the packet is a SYN packet.

In step 315, the firewall records the relevant packet information. In one embodiment, the source and destination IP addresses, the source and destination TCP ports, the client-specified TCP initial sequence number and/or the client's receive window size are stored by the firewall.

In step 320, the firewall simply forwards the SYN packet to the host system and the firewall will subsequently receive an acknowledgement of the request from the host system in step 325. In the context of TCP, the acknowledgement is a SYN-ACK packet.

In step 330, the firewall forwards the SYN-ACK packet to the client system. A timer or counter is also started when the SYN-ACK packet is forwarded by the firewall to the client that was the source of the SYN packet.

In step 340, the firewall queries whether a response to the SYN-ACK is received from the client system within the timer threshold. If the query is positively answered, then method 300 proceeds to step 345 and the ACK packet is forwarded to the host system. If the query is negatively answered, then method 300 proceeds to step 350, where a reset signal is forwarded to the host system and the client system (in case it exists, but the firewall did not receive the ACK in time), thereby shutting down the half-open connection. Method 300 ends in step 355.

Figure 4:
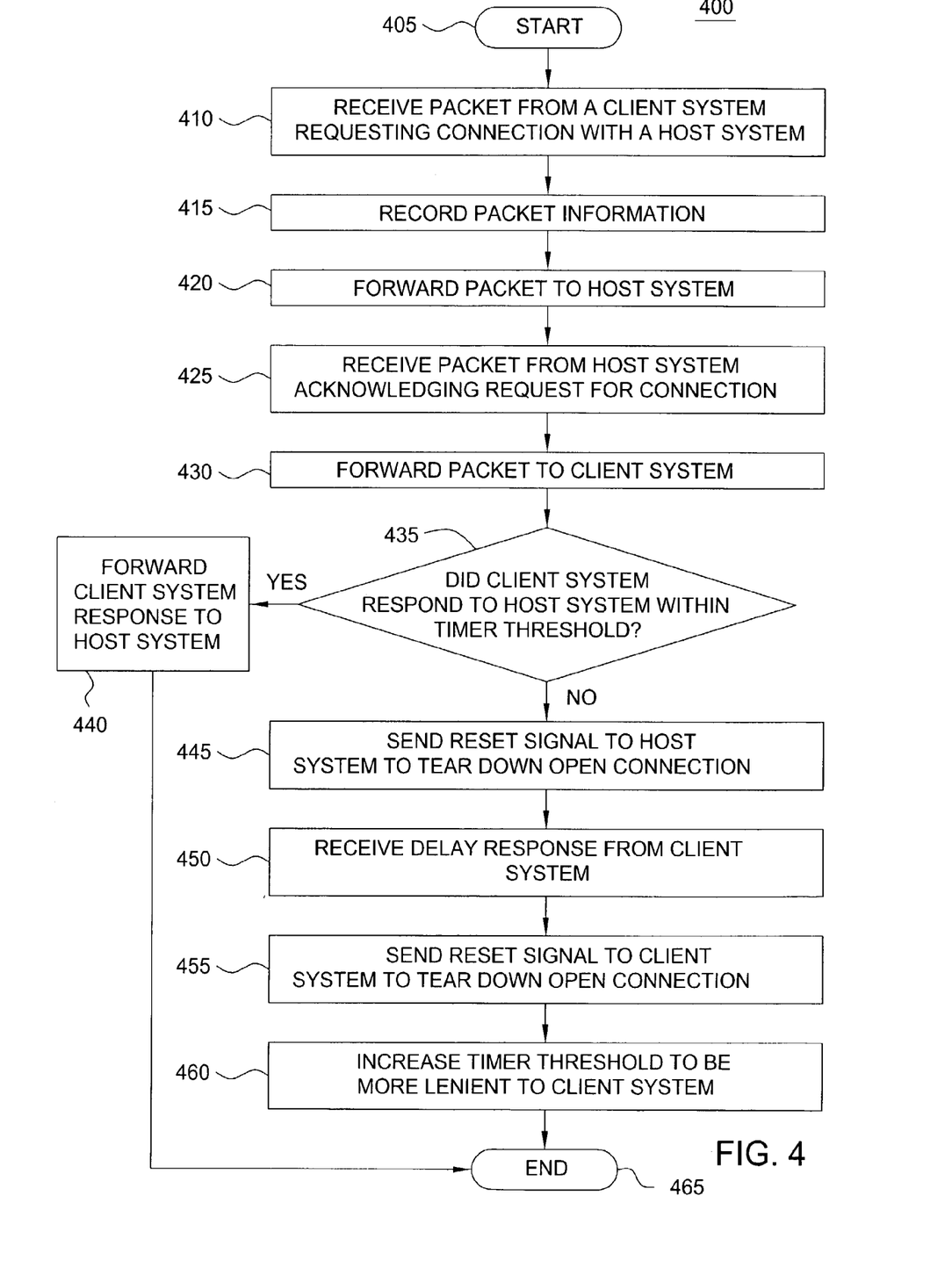
FIG. 4 illustrates a flowchart of an alternate method for deflecting connection flooding attacks of the present invention.

FIG. 4 illustrates a flowchart of a method 400 for deflecting connection flooding attacks. Specifically, method 400 addresses the scenario where a delayed ACK packet is ultimately received by the firewall after the timer threshold has elapsed. Since steps 410-445 are identical to steps 310-350 of FIG. 3, the descriptions of these steps are provided above.

In step 450, the firewall receives a delayed response to the host system's acknowledgement of request for connection. In the context of TCP, the delayed response is an ACK packet.

In step 455, the firewall generates and sends a reset signal to the client system to tear down its half-open connection. In the context of TCP, the reset signal is a RST packet.

In step 460, the firewall may optionally increase the timer threshold to be more lenient to this particular client system. Namely, if the firewall receives a SYN packet having the same source IP address in the future, the firewall will increase the timer threshold for receiving the ACK packet. This will allow the client system to establish a connection with the host system even though the client system's response speed is below the predefined or default threshold.

Figure 5:
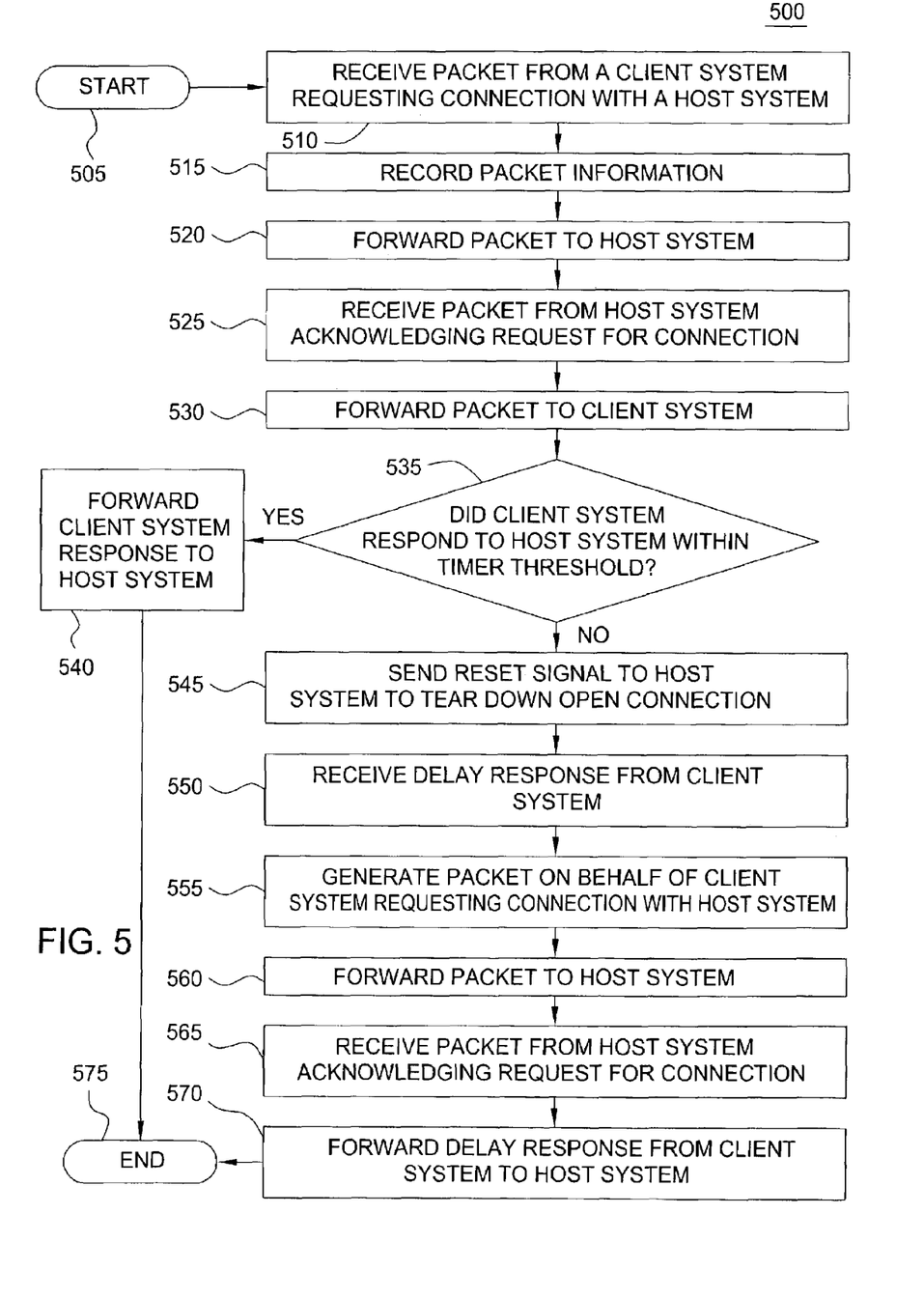
FIG. 5 illustrates a flowchart of an alternate method for deflecting connection flooding attacks of the present invention.

FIG. 5 illustrates a flowchart of a method 500 for deflecting connection flooding attacks. Specifically, method 500 also addresses the scenario where a delayed ACK packet is ultimately received by the firewall after the timer threshold has elapsed. Since steps 510-545 are identical to steps 410-445 of FIG. 4, the descriptions of these steps are provided above.

In step 550, the firewall receives a delayed response to the host system's acknowledgement of request for connection. In the context of TCP, the delayed response is an ACK packet.

In step 555, the firewall generates a request for connection packet on behalf of the client system by using the stored packet information in the firewall. In the context of the TCP, the packet is a SYN packet. Specifically, the firewall will generate the SYN packet with the stored packet information, e.g., the sequence number of the client system that was previously stored.

In step 560, the firewall forwards the SYN packet to the host system and the firewall will subsequently receives an acknowledgement of request for connection in step 565. In the context of TCP, the packet is a SYN-ACK packet.

In step 570, the firewall then forwards the delayed ACK packet to the host system. Method 500 then ends in step 575.

Although various embodiments which incorporate the teachings of the present invention have been shown and described in detail herein, those skilled in the art can readily devise many other varied embodiments that still incorporate these teachings.

What is claimed is:

1. Method for regulating the passage of packets between a host system and a client system in a network computing environment, said method comprising the steps of:

receiving a first packet from the client system, wherein said first packet contains information representative of a request for start of connection;

recording packet information of said first packet;

passing said first packet to the host system;

receiving a second packet from the host system, wherein said second packet contains information representative of an acknowledgement by the host system of said request for start of connection;

passing said second packet to the client system;

monitoring a response by the client system to said second packet for occurrence within a timer threshold;

sending a reset signal to the host system for shutting down a half-open connection if said response by the client system to said second packet is not received within said timer threshold;

receiving a delayed response from the client system to said second packet after said elapse of said timer threshold; and raising said timer threshold to be more lenient to the client system that previously forwarded said delayed response.

2. The method of claim 1, wherein said packet information comprises a source Internet Protocol (IP) address, a destination Internet Protocol (IP) address, a source Transmission Control Protocol (TCP) port, a destination Transmission Control Protocol (TCP) port, and a client-specified TCP initial sequence number.

3. The method of claim 1, wherein said packet information comprises a client's receive window size.

4. The method of claim 1, wherein said first packet is a SYN packet in accordance with the Transmission Control Protocol (TCP).

5. The method of claim 1, wherein said second packet is a SYN-ACK packet in accordance with the Transmission Control Protocol (TCP).

6. The method of claim 1, wherein said response by the client system to said second packet is an ACK packet in accordance with the Transmission Control Protocol (TCP).

7. Method for regulating the passage of packets between a host system and a client system in a network computing environment, said method comprising the steps of:

receiving a first packet from the client system, wherein said first packet contains information representative of a request for start of connection;

recording packet information of said first packet;

passing said first packet to the host system;

receiving a second packet from the host system, wherein said second packet contains information representative of an acknowledgement by the host system of said request for start of connection;

passing said second packet to the client system;

monitoring a response by the client system to said second packet for occurrence within a timer threshold;

sending a reset signal to the host system for shutting down a half-open connection if said response by the client system to said second packet is not received within said timer threshold;

receiving a third packet from the client system as a delayed response to said second packet after said elapse of said timer threshold;

generating a fourth packet on behalf of the client system, wherein said fourth packet contains information representative of a request for start of connection and is based on information stored from said first packet; and passing said fourth packet to the host system.

8. The method of claim 7, further comprising the steps of:

receiving a fifth packet from the host system, wherein said fifth packet contains information representative of an acknowledgement by the host system of said request for start of connection; and passing said third packet to the host system.

9. The method of claim 8, wherein said fourth packet is a SYN packet in accordance with the Transmission Control Protocol (TCP).

10. The method of claim 8, wherein said fifth packet is a SYN-ACK packet in accordance with the Transmission Control Protocol (TCP).

11. The method of claim 8, wherein said third packet is an ACK packet in accordance with the Transmission Control Protocol (TCP).

12. The method of claim 8, wherein a sequence number is translated in forming said fourth packet.

13. Method for regulating the passage of packets between a host system and a client system in a network computing environment, said method comprising the steps of:

receiving a first packet from the client system, wherein said first packet contains information representative of a request for start of connection;

recording packet information of said first packet;

passing said first packet to the host system;

receiving a second packet from the host system, wherein said second packet contains information representative of an acknowledgement by the host system of said request for start of connection;

passing said second packet to the client system;

monitoring a response by the client system to said second packet for occurrence within a timer threshold;

sending a reset signal to the host system for shutting down a half-open connection if said response by the client system to said second packet is not received within said timer threshold;

receiving a delayed response from the client system to said second packet after said elapse of said timer threshold;

receiving a third packet from the client system as a delayed response to said second packet after said elapse of said timer threshold;

generating a fourth packet on behalf of the client system, wherein said fourth packet contains information representative of a request for start of connection; and passing said fourth packet to the host system.

14. The method of claim 13, further comprising the steps of:

receiving a fifth packet from the host system, wherein said fifth packet contains information representative of an acknowledgement by the host system of said request for start of connection; and passing said third packet to the host system.

15. The method of claim 14, wherein said fourth packet is a SYN packet in accordance with the Transmission Control Protocol (TCP).

16. The method of claim 14, wherein said fifth packet is a SYN-ACK packet in accordance with the Transmission Control Protocol (TCP).

17. The method of claim 14, wherein said third packet is an ACK packet in accordance with the Transmission Control Protocol (TCP).

18. The method of claim 14, wherein a sequence number is translated in forming said fourth packet.

19. The method of claim 14, further comprising the step of:

raising said timer threshold to be more lenient to the client system that previously forwarded said delayed response.

20. The method of claim 14, wherein said packet information comprises a source Internet Protocol (IP) address, a destination Internet Protocol (IP) address, a source Transmission Control Protocol (TCP) port, a destination Transmission Control Protocol (TCP) port, and a client-specified TCP initial sequence number.

21. The method of claim 14, wherein said packet information comprises a client's receive window size.

22. The method of claim 14, wherein said first packet is a SYN packet in accordance with the Transmission Control Protocol (TCP).

23. The method of claim 14, wherein said second packet is a SYN-ACK packet in accordance with the Transmission Control Protocol (TCP).

24. The method of claim 14, wherein said response by the client system to said second packet is an ACK packet in accordance with the Transmission Control Protocol (TCP).

25. A computer readable storage medium holding code that when executed causes a computing device to transact a validated application session in a networked computing environment by performing the steps of:

receiving a first packet from the client system, wherein said first packet contains information representative of a request for start of connection;

recording packet information of said first packet;

passing said first packet to the host system;

receiving a second packet from the host system, wherein said second packet contains information representative of an acknowledgement by the host system of said request for start of connection;

passing said second packet to the client system;

monitoring a response by the client system to said second packet for occurrence within a timer threshold;

sending a reset signal to the host system for shutting down a half-open connection if said response by the client system to said second packet is not received within said timer threshold;

receiving a delayed response from the client system to said second packet after said elapse of said timer threshold;

receiving a third packet from the client system as a delayed response to said second packet after said elapse of said timer threshold;

generating a fourth packet on behalf of the client system, wherein said fourth packet contains information representative of a request for start of connection; and passing said fourth packet to the host system.

* * * * *